(12) United States Patent
Schwarz et al.

(10) Patent No.: US 10,584,608 B2
(45) Date of Patent: Mar. 10, 2020

(54) TUNED ROTOR DISK

(71) Applicant: United Technologies Corporation, Hartford, CT (US)

(72) Inventors: Frederick M. Schwarz, Glastonbury, CT (US); Dilip M. Shah, Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 485 days.

(21) Appl. No.: 14/810,847

(22) Filed: Jul. 28, 2015

(65) Prior Publication Data

US 2016/0153305 A1 Jun. 2, 2016

Related U.S. Application Data (60) Provisional application No. 62/034,207, filed on Aug. 7, 2014.

(51) Int. Cl.
 *F01D 11/18* (2006.01)
 *F01D 5/26* (2006.01)
 (Continued)

(52) U.S. Cl.
 CPC ............... *F01D 11/18* (2013.01); *F01D 5/02* (2013.01); *F01D 5/06* (2013.01); *F01D 5/26* (2013.01); *F01D 5/28* (2013.01); *F04D 29/023* (2013.01); *F04D 29/164* (2013.01); *F04D 29/324* (2013.01); *F04D 29/526* (2013.01);
 (Continued)

(58) Field of Classification Search
 CPC ....................................................... F01D 11/18
 See application file for complete search history.

(56) References Cited

U.S. PATENT DOCUMENTS 4,479,293 A * 10/1984 Miller ........................ B21J 5/00
 148/527
4,885,216 A * 12/1989 Naik ...................... C22C 19/056
 428/680

(Continued)

FOREIGN PATENT DOCUMENTS

| EP | 2570615 | 3/2013 |
|---|---|---|
| EP | 2799668 | 11/2014 |
| GB | 2483061 | 2/2012 |

OTHER PUBLICATIONS

European Search Report for European Patent Application No. 15180085 completed Apr. 4, 2016.

*Primary Examiner* — Dwayne J White
*Assistant Examiner* — Behnoush Haghighian
(74) *Attorney, Agent, or Firm* — Carlson, Gaskey & Olds, P.C.

(57) ABSTRACT

A gas turbine engine includes a rotor that has a rotor disk and a plurality of circumferentially-spaced blades. The rotor disk and the blades are co-rotatable about an axis. A case circumscribes the rotor. The rotor disk is tuned, with regard to centrifugal and thermal growth responsiveness, to the case for a given operational scenario of the gas turbine engine such that the rotor disk and case together provide a tuned clearance response. The operational scenario involves a series of engine events that include at least two of engine acceleration, engine deceleration, engine steady-state operation.

12 Claims, 4 Drawing Sheets

(51) Int. Cl.
  *F01D 5/06* (2006.01)
  *F01D 5/02* (2006.01)
  *F01D 5/28* (2006.01)
  *F04D 29/02* (2006.01)
  *F04D 29/16* (2006.01)
  *F04D 29/32* (2006.01)
  *F04D 29/52* (2006.01)

(52) U.S. Cl.
  CPC .. *F05D 2220/32* (2013.01); *F05D 2300/5021* (2013.01); *F05D 2300/608* (2013.01); *Y02T 50/671* (2013.01)

(56) References Cited

U.S. PATENT DOCUMENTS

| | | | |
|---|---|---|---|
| 5,113,583 A | 5/1992 | Jenkel et al. | |
| 5,413,752 A * | 5/1995 | Kissinger | B22F 3/24 |
| | | | 148/514 |
| 5,863,183 A | 1/1999 | Dierksmeier et al. | |
| 6,969,240 B2 | 11/2005 | Strangman | |
| 8,206,117 B2 | 6/2012 | Strangman et al. | |
| 9,546,564 B2 * | 1/2017 | Lewis | F01D 11/20 |
| 2011/0129347 A1 * | 6/2011 | Schneefeld | B23K 20/129 |
| | | | 416/223 R |
| 2012/0171039 A1 * | 7/2012 | Huang | F01D 5/282 |
| | | | 416/219 R |
| 2012/0301269 A1 * | 11/2012 | Alvanos | F01D 5/282 |
| | | | 415/1 |
| 2013/0108466 A1 * | 5/2013 | Suciu | F01D 5/027 |
| | | | 416/96 R |
| 2014/0366996 A1 * | 12/2014 | Goncharov | B23K 1/005 |
| | | | 148/528 |
| 2014/0373979 A1 * | 12/2014 | Gu | C22C 19/05 |
| | | | 148/428 |
| 2015/0354358 A1 * | 12/2015 | Grande, III | B22F 3/17 |
| | | | 416/241 R |

* cited by examiner

TUNED ROTOR DISK

CROSS-REFERENCE TO RELATED APPLICATION

The present disclosure claims priority to U.S. Provisional Patent Application No. 62/034,207, filed Aug. 7, 2014.

BACKGROUND

A gas turbine engine typically includes a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor, and optionally a fan section if the engine is for propulsion. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

A speed reduction device, such as an epicyclical gear assembly, may be utilized to drive the fan section such that the fan section rotates at a speed different than the turbine section. In such engine architectures, a shaft driven by one of the turbine sections provides an input to the epicyclical gear assembly that drives the fan section at a reduced speed.

SUMMARY

In a featured embodiment, a gas turbine engine includes a rotor including a rotor disk and a plurality of circumferentially-spaced blades, the rotor disk and the blades being co-rotatable about an axis; and a case circumscribing the rotor, the rotor disk being tuned, with regard to centrifugal and thermal growth responsiveness, to the case for a given operational scenario of the gas turbine engine such that the rotor disk and case together provide a tuned clearance response, the operational scenario involving a series of engine events including at least two of: engine acceleration, engine deceleration, and engine steady-state operation.

In an embodiment according to the previous embodiment, the rotor disk has a mass and is formed of a material, the mass and the material being selected with regard to the centrifugal and thermal growth responsiveness.

In an embodiment according to any of the previous embodiments, the material has a single crystal structure.

In an embodiment according to any of the previous embodiments, the rotor disk includes a central hub that is formed with the single crystal structure.

In an embodiment according to any of the previous embodiments, the rotor is in a compressor.

In an embodiment according to any of the previous embodiments, the rotor is in at least one of a final five stages of a compressor.

In an embodiment according to any of the previous embodiments, the rotor is in a turbine.

In an embodiment according to any of the previous embodiments, the plurality of circumferentially-spaced blades are arranged on a rim of the rotor disk.

In an embodiment according to any of the previous embodiments, the rotor disk and the plurality of blades are formed with a single crystal structure.

In another featured embodiment, a gas turbine engine includes a rotor including a rotor disk and a plurality of circumferentially-spaced blades, the rotor disk and the blades being co-rotatable about an axis and a case circumscribing the rotor, wherein the rotor disk having at least a centrifugal and thermal growth responsiveness to a given operational scenario of the gas turbine engine such that instantaneous location of tips of the blades vary during the operational scenario. The case has at least a thermal responsiveness to the operational scenario such that instantaneous location of the case varies during the operational scenario, the operational scenario involving a series of engine events including at least two of: engine acceleration, engine deceleration, and engine steady-state operation, and the rotor disk being tuned, with regard to the centrifugal and thermal growth responsiveness of the rotor disk, to the case for the operational scenario such that the rotor disk and case together provide a tuned clearance response.

In an embodiment according to the previous embodiment, the rotor disk has a mass and is formed of a material, the mass and the material being selected with regard to the centrifugal and thermal growth responsiveness.

In an embodiment according to any of the previous embodiments, the material has a single crystal structure.

In an embodiment according to any of the previous embodiments, the rotor disk includes a central hub that is formed with the single crystal structure.

In an embodiment according to any of the previous embodiments, the rotor is in a compressor.

In an embodiment according to any of the previous embodiments, the rotor is in a turbine.

In an embodiment according to any of the previous embodiments, the plurality of circumferentially-spaced blades are arranged on a rim of the rotor disk.

In another featured embodiment, a method for a gas turbine engine includes a rotor with a rotor disk and a plurality of circumferentially-spaced blades, the rotor disk and the blades are co-rotatable about an axis, and a case that circumscribes the rotor, wherein the rotor disk has at least a centrifugal and thermal growth responsiveness to a given operational scenario of the gas turbine engine such that instantaneous location of tips of the blades vary during the operational scenario, the case has at least a thermal responsiveness to the operational scenario such that instantaneous location of the case varies during the operational scenario, the operational scenario involves a series of engine events that include at least two of: engine acceleration, engine deceleration, and engine steady-state operation, and tuning the rotor disk, with regard to the centrifugal and thermal growth responsiveness of the rotor disk, to the case for the operational scenario such that the rotor disk and case together provide a tuned clearance response.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
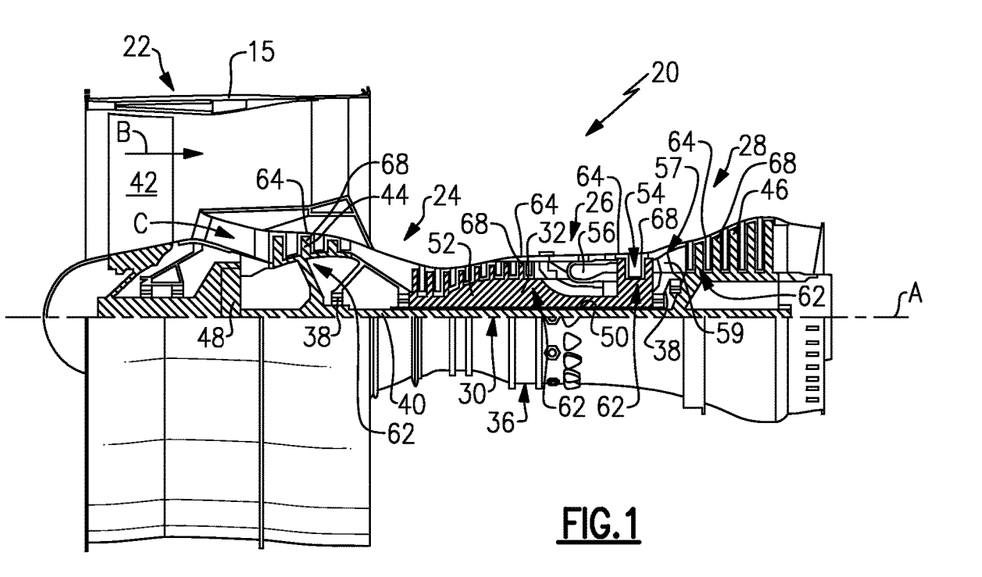
FIG. 1 illustrates an example gas turbine engine.

FIG. 1 illustrates an example gas turbine engine 20. The illustrated gas turbine engine 20 is a two-spool turbofan that includes a fan section 22, a compressor section 24, a combustor section 26, and a turbine section 28. Alternative engine architectures might include an augmentor section (not shown), among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although illustrated in a two-spool architecture, which may be used on a single-multi-isle aircraft, it is to be understood that the examples herein are not limited to two-spool architectures and may be applied to other types of turbine engines, including direct drive architectures, three-spool architectures, and ground-based engines that do not have a fan section.

The example engine 20 includes a low speed spool 30 and a high speed spool 32 mounted for rotation about an engine central longitudinal axis A relative to an engine static structure 36 via several bearing systems 38. Various bearing systems 38 at various locations may alternatively or additionally be provided, and the location of the bearing systems 38 may be varied as appropriate to the particular engine architecture.

The low speed spool 30 includes an inner shaft 40 that interconnects a fan 42, a first (or low) pressure compressor 44 and a first (or low) pressure turbine 46. The inner shaft 40 is connected to the fan 42 through a speed change mechanism, which in this example is a gear system 48, to drive the fan 42 at a lower speed than the low speed spool 30. The high speed spool 32 includes an outer shaft 50 that interconnects a second (or high) pressure compressor 52 and a second (or high) pressure turbine 54.

A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A, which is collinear with their longitudinal axes.

The core airflow in core flow path C is compressed by the low pressure compressor 44 and then the high pressure compressor 52, mixed and burned with fuel in the combustor 56, and then expanded over the high pressure turbine 54 and low pressure turbine 46. The mid-turbine frame 57 includes airfoils 59, which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and gear system 48 may be varied. For example, the gear system 48 may be located aft of the combustor section 26, or even aft of the turbine section 28, and the fan section 22 may be positioned forward or aft of the gear system 48.

The engine 20 in one example is a high-bypass geared aircraft engine. In a further example, the engine 20 bypass ratio is greater than about six, with further example embodiments being greater than about ten, greater than about twelve, or greater than about fifteen. The gear system 48 can be an epicyclic gear train, such as a planetary or star gear system or other gear system, with a gear reduction ratio of greater than about 2.3. In further examples, the gear reduction ratio is greater than about 2.6, greater than about 3.1, or greater than about 3.6.

In further examples, the first (or low) pressure turbine 46 has a pressure ratio that is greater than about five. In one disclosed embodiment, the engine 20 bypass ratio is greater than about ten, the fan diameter is significantly larger than that of the first (or low) pressure compressor 44, and the first (or low) pressure turbine 46 has a pressure ratio that is greater than about five. The pressure ratio of the first (or low) pressure turbine 46 is pressure measured prior to inlet of the first (or low) pressure turbine 46 as related to the pressure at the outlet of the first (or low) pressure turbine 46 prior to an exhaust nozzle.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ("TSFC")"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } °R)/(518.7° R)]^{0.5}$. The "Low corrected fan tip speed" as disclosed herein according to one non-limiting embodiment is less than about 1150 ft/second.

In further examples, the engine 20 may have a high "T3" and high Overall Pressure Ratio (OPR). The parameter "T3" is the temperature at the exit of the final stage of the second (or high) pressure compressor 52, and the parameter OPR is the ratio of the pressure at the exit of the final stage of the second (or high) pressure compressor 52 to the pressure at the inlet to the fan section 22. In general, increasingly higher "T3" and increasingly higher OPR correspond to a potential increase in engine performance. However, mere increase in these parameters alone is not sufficient to realize the potential benefits, due to surrounding engine design considerations. For example, increased temperatures and pressures can cause a designer to distort aspects of the structural and material designs to achieve an adequate design life and thereby incur extraordinary engine inefficiencies. Thus, advancements in the surrounding engine design considerations are needed to enable increases in those parameters. The further examples described herein below, which relate to the surrounding engine design considerations, can enable increased "T3" and OPR. It is to be appreciated though, that although the examples can enable higher "T3" and OPR, the examples are not limited to engines that are designed for higher "T3" and OPR.

The illustrated engine 20 includes one or more rotors, schematically represented at 62. In the example shown, each of the first (or low) pressure compressor 44, the first (or low) pressure turbine 46, the second (or high) pressure compressor 52, and the second (or high) pressure turbine 54 include such rotors 62. Although the rotors 62 are commonly numbered, the design and geometry of each of the rotors 62 may of course vary according to the functions served in that section of the engine 20 that the rotor 62 is used in.

For each such rotor 62, there is a corresponding case 64 that circumscribes the rotor 62. For example, the case 64 can have a circumferentially-segmented structure such that the segments assembled together into a ring encompass or encircle the given rotor 62. The case or cases 64 can also include seal structures, such as an abradable seal. Generally, there is an open clearance between the case 64 and the corresponding rotor 62. In this regard, the clearance relates to the above-discussed surrounding engine design considerations. In general, a tight clearance is desired to reduce escape of gases (escape of compressed air in the compressor or escape of combustion gas in the turbine) around the tips of the airfoils in the given section of the engine. However, a clearance is subject to mismatch in the centrifugal and thermal growth of the given rotor and thermal growth of the corresponding case.

In the normal design paradigm, a rotor may be designed primarily with regard to temperature and strength requirements to meet a given engine performance objective. The corresponding case is then designed around the rotor to provide as tight a clearance as possible during all transient and steady-state conditions. However, this paradigm, being subservient primarily to the temperature and strength requirements of the given engine performance objective, has inherent limitations which result in limitations on how tight the clearances can be. As will also be evident from the further examples below, the rotors 62 herein are tuned with regard to centrifugal and thermal growth responsiveness, to the case 64 for a given operational scenario of the engine 20 such that the rotor 62 and the case 64 together provide a tuned clearance response, which in turn enables tighter clearances and engine performance enhancements. It is to be appreciated that the phrase "centrifugal and thermal growth responsiveness" refers to both expansion (positive growth) and contraction (negative growth).

Figure 2:
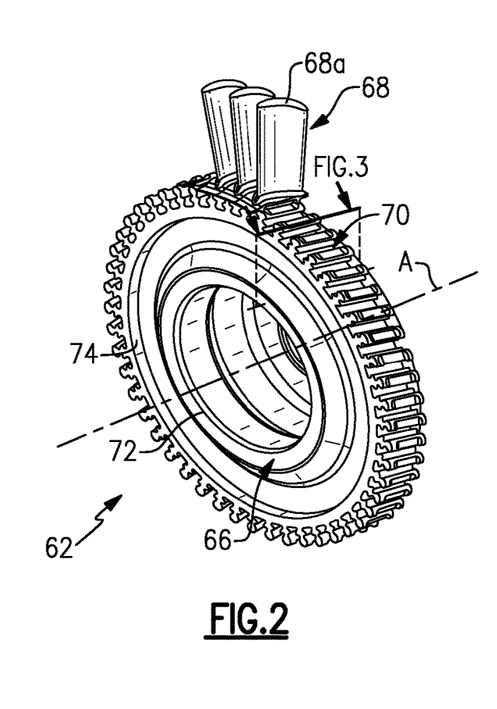
FIG. 2 illustrates an isolated view of a rotor of the gas turbine engine.

FIG. 2 illustrates an isolated view of a representative one of the rotors 62. Again, although the representative rotors 62 may be, for example, designed for use in the second (or high) pressure turbine 54, it is to be understood that the examples herein can be extended to the rotors 62 and other sections of the engine 20.

The rotor 62 includes a rotor disk 66 and a plurality of circumferentially-spaced blades 68 (hereafter "blades 68"). In this example, the blades 68 are mounted on the rotor disk 66 in axial slots 70. The rotor disk 66 includes a central hub 72 and a peripheral rim 74. The rim 74 can be integral in a monolithic piece with the central hub 72 or, alternatively, can be an initially separate piece that is bonded in a bond interface with the central hub 72. Likewise, the blades 68 can be integral in a monolithic piece with the rim 74 or, as shown, separate pieces that are mounted in the axial slots 70. It is to be understood that although the blades 68 are mounted in or are integral with the rotor disk 66, other types of rotors 62, which may be referred to as mini-disks, may not include such blades 68 mounted thereon or integral therewith. In such instances, the blades 68 would be mounted on, or integral with, an adjacent rotor 62, but would nevertheless be co-rotatable with the rotor disk 66. That is, the blades 68 on the adjacent rotor 62 would co-rotate with the mini-disk.

Figure 3:
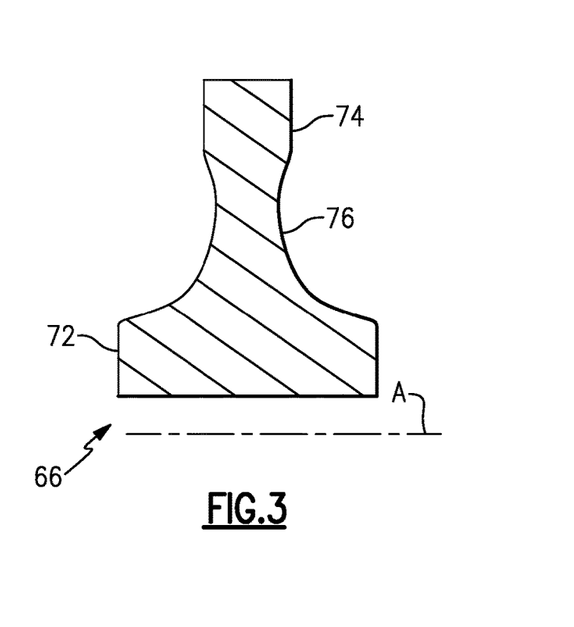
FIG. 3 illustrates a cross-section of a rotor disk of the rotor of FIG. 2.

As shown in the sectioned view of the rotor disk 66 in FIG. 3, the central hub 72 in this example is axially-enlarged relative to the rim 74. Relative to the engine longitudinal central axis A, the central hub 72 can taper to a neck portion 76 that connects to the rim 74. The rotor disk 66 and blades 68, whether mounted or integral with the rotor disk 66 or mounted or integral with an adjacent rotor 62, are co-rotatable with the rotor disk 66 about the engine central axis A.

A rotor disk typically has a large growth mismatch with its corresponding case with regard to centrifugal and thermal growth responsiveness for a given operational scenario of an engine. For example, during operation of the engine, centrifugal forces on the rotor disk, along with thermal expansion/contraction through various temperature cycles in the operation, cause a thick rotor disk to expand and contract at quite different rates relative to the thin case. The large expansion and contraction changes the radial location of tips of the blades, and requires large design clearance. However, the rotor disk 66 is tuned with regard to centrifugal and thermal growth responsiveness, to the corresponding case 64 for a given operational scenario of the engine 20 such that the rotor disk and case together provide a tuned clearance response. For example, during operation of the engine 20, centrifugal forces on the rotor disk 66, along with thermal expansion/contraction through various temperature cycles in the operation, can cause the rotor disk 66 to expand and contract. The expansion and contraction changes the radial location of tips 68a of the blades 68, but in a controlled, tuned manner with respect to the case 64.

Figure 4:
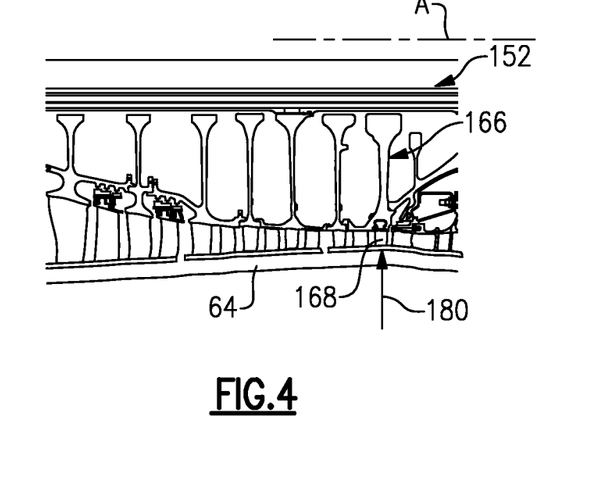
FIG. 4 illustrates an example of a compressor section.

FIG. 4 illustrates one example of the relative clearance in a second (or high) pressure compressor 152 that includes a rotor disk 166 and circumferentially-spaced blades 168, similar to as described above. In this example, the rotor disk 166 is the final stage of the second (or high) pressure compressor 152, but can be within any of the final five stages of the second (or high) pressure compressor 152. During operation of the engine, there is a clearance, represented schematically at 180, between the tips of the blades 168 and the corresponding case 64. The clearance 180 changes through various operational scenarios of the engine.

Figure 5:
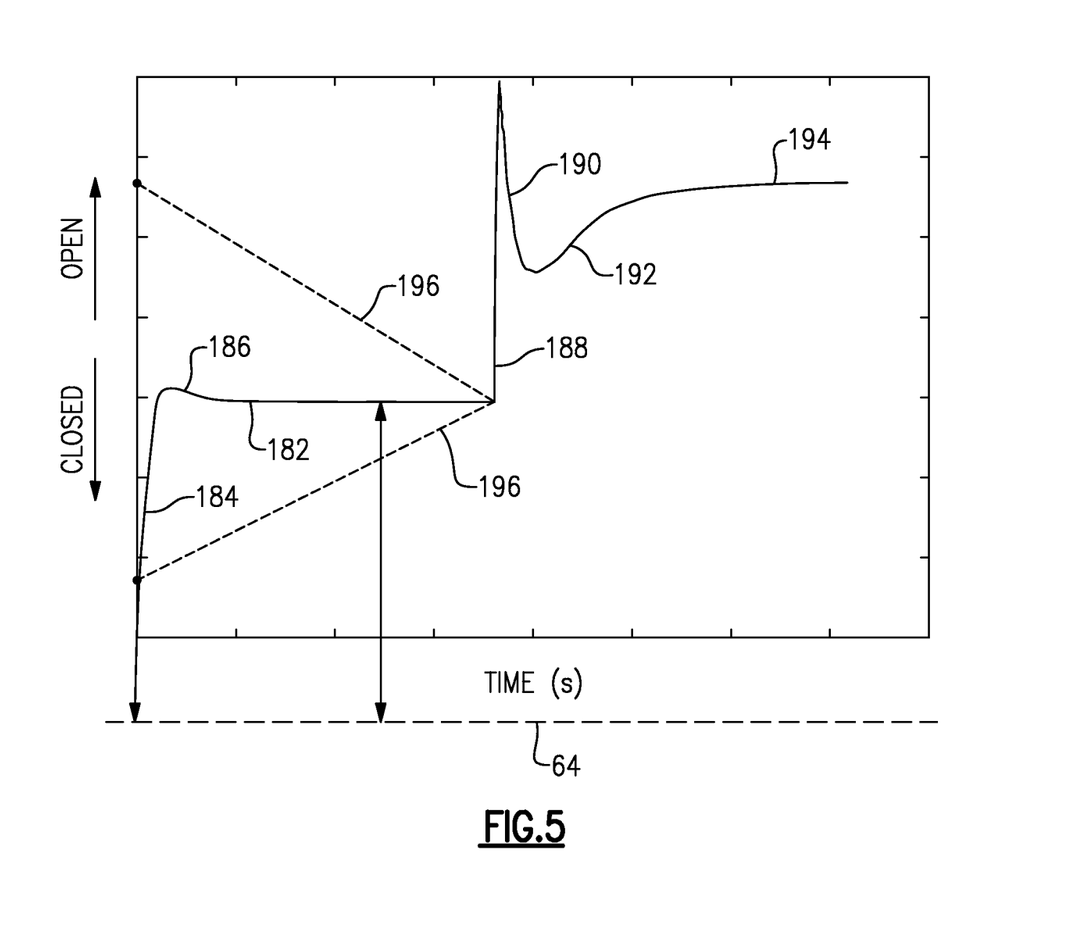
FIG. 5 schematically illustrates a clearance between tips of rotor blades of a rotor and a corresponding case through various engine operational scenarios.

FIG. 5 graphically depicts centrifugal and thermal growth responsiveness of the rotor disk 166 through various operational scenarios. The phrase "operational scenarios" as used herein refers to a series of engine events that includes at least two of engine acceleration, engine deceleration, and engine steady-state operation (no acceleration or deceleration).

As shown in FIG. 5, the line 182 represents the relative clearance between the tips of the blades 168 and the case 64 through various engine events over time (x-axis). Initially, as shown at the farthest left-hand side of FIG. 5, the engine is at idle and there is thus an initial clearance between the tips of the blades 168 and the case 64. The position of the case 64 is schematically represented toward the bottom of FIG. 5. During takeoff, the engine accelerates and centrifugal forces are applied to the rotor disk 166. The rotor disk 166 thus expands and closes the clearance between the tips of the blades 168 and the case 64, as represented by the near-vertical line extending downward from the idle point. During this time, thermal influence is relatively small and most of the expansion in the size of the rotor disk 166 is from the centrifugal forces.

If the engine is held at full takeoff power, the engine reaches a steady-state of operation and is no longer accelerating, and thermal effects take influence and change the clearance between the tips of the blades 168 and the case 64. For example, the clearance opens at portion 184 because the thin case 64 thermally expands more rapidly than the rotor disk 166 due to difference in mass. That is, the case 64 is thermally faster than the rotor disk 166. At portion 186, the thermal response of the case 64 has ended and the lagging thermal response of the rotor disk 166 begins to catch up to the expansion of the case 64. The growth of the rotor disk 166 recovers a small portion of the clearance such that the clearance slightly closes. Once the rotor disk 166 and case 64 complete their thermal growth, there is a constant clearance over the remainder of a steady-state operation event of the engine.

In this example, the steady-state operation event is followed by a deceleration event of the engine at portion 188. At this stage, the temperature in the second (or high) pressure compressor 152 is greatly elevated from the prior steady-state operating event. During the deceleration 188, there are lower centrifugal forces and the rotor disk 166 thus contracts rapidly such that the clearance opens. However, again due to the relative difference in mass between the case 64 and the rotor disk 166, the case 64 cools as temperatures decline, and thus contracts. The case 64 contracts more rapidly than the rotor disk 166. Portion 190 represents the case 64 cooling more rapidly than the rotor disk 66 such that the clearance closes. The lagging thermal response of the rotor disk 166 catches up with the case 64 to recover a portion of the clearance such that the clearance slightly opens at portion 192 until another steady-state operational event at 194 which is the idle power clearance as on the left side of the figure.

The shape of the line 182, for example with regard to portions 184 and 186, and 190 and 192, is representative of the centrifugal and thermal growth responsiveness of the rotor disk 166. The characteristic clearance response includes the shape and position of portions 184 and 186, and 190 and 192, of the line 182, and/or the position of the extreme peaks/valleys of the line 182. Ultimately, this clearance response influences where the case 64 can be located radially and how tight the clearance can be for a given operational scenario of a series of engine events.

In one further example, the operational scenario may be a so-called "worst case" scenario. An example of such a scenario is at the valley in the line 182 at portions 190 and 192. If, at or near that valley, the engine were to be re-accelerated, centrifugal forced would be applied to the rotor disk 166. However, unlike the initial takeoff setting at the left side of the figure, where the rotor disk 166 is at a cooler temperature, the temperature of the rotor disk 166 by the point of the re-acceleration is much greater. As a result, the centrifugal force causes a much greater expansion and can exceed a given design clearance such that the blades rub with the case. In particular, the gap between the rotor and outer air seals can be tuned to such a scenario, to increase the clearance response during such engine events and thus ensure that a proper clearance is provided so that the tips of the blades 168 do not rub against the case 64.

The tuning of the rotor disk 166 relates to the mass of the rotor disk 166 and the material selected for the rotor disk 166. In one example, the material has a single crystal structure (atomic arrangement). More particularly, the single crystal structure can formed of a superalloy, such as a nickel-based superalloy that has a solvus temperature greater than 2400° F. (1316° C.). An example nickel-based super alloy is described in Table 1 below.

TABLE 1

| Element | Nominal Composition (%) |
|---|---|
| C | — |
| Cr | 5 |
| Ni | Bal |
| Co | 10 |
| Mo | 1.9 |
| W | 5.9 |
| Nb/Cb | — |
| Ta | 8.7 |
| Ti | — |
| Al | 5.65 |
| B | — |
| Zr | — |
| Hf | 0.1 |
| Re | 3 |

As used herein, the phrase "single crystal" refers to a structure in which all or substantially all of the material has a single crystallographic orientation that is substantially free of high-angle grain boundaries. High-angle grain boundaries are grain boundary defects where the two neighboring grains are misoriented by no more than a specified angle, such as 10°.

In the example of the rotor disk 66, or any of the rotor disks herein, the central hub 72 and the rim 74 can both be formed of the single crystal alloy. In additional examples, only the central hub 72 or only the rim 74 may be formed of the single crystal alloy, while other portions of the rotor disk 66 are formed from other alloys that may not be single crystal. In further examples, all or substantially all of the rotor disk 66 is formed of the single crystal alloy.

Relative to polycrystalline alloys, single crystal alloys exhibit better mechanical properties. Even so, mere use of a single crystal alloy alone in place of the geometry of a disk that is normally formed of a polycrystalline alloy, would not be sufficient to tune the disk. Rather, the better mechanical properties enable additional changes to the disk, and thus enable the tuning. For instance, because of the better mechanical properties, a given disk can be made smaller and more responsive, with less mass, if it is formed of the single crystal alloy. With less mass, the disk, such as rotor disk 166, is less centrifugally and more thermally growth responsive than a larger rotor disk formed of polycrystalline alloy. Thus, by forming the rotor disk 166 of the single crystal alloy and designing the rotor disk 166 with relatively smaller mass, the centrifugal and thermal growth responsiveness can be tuned to provide a desired shape of the line 182 for a given operational scenario.

Such tuning has not been possible previously under the above-described design paradigm, since rotors were designed primarily to temperature and strength requirements to meet a given engine life objective. Although such objective must still be met, the use of the single crystal alloy in the rotor disks 66 may actually be an "over-design" for the given temperature and strength requirements. In other words, in low temperature use environments, where less costly alloys and manufacturing processes could be used, there is normally no reason to use a single crystal alloy. In this disclosure though, the single crystal alloy may be used in such low temperature environments to enable tuning the rotor disk 66 to provide a desired tuned clearance response. Such rotor disks 66 may be in the compressor section 24 of the engine 20, for example, which has lower temperature requirements than a turbine. The single crystal alloy may also be an "over-design" in some turbine sections, but can be used as disclosed herein to enable tuning the rotor disk 66 to provide a desired tuned clearance response. Thus, regardless of the temperature of the use environment, the single crystal alloy can be used for tuning to enhance clearance tightness and engine efficiency.

As will be further appreciated, single crystal alloys exhibit better stress versus temperature performance for creep properties. As a result, for a given design stress, the single crystal alloy can withstand a much higher exposure temperature than a polycrystalline alloy. For example, at a given allowed design stress, the rotor disk 166 has a maximum exposed operating temperature. Although this maximum exposed operating temperature may be well below the temperatures that the single crystal alloy can withstand for the given allowed design stress, the single crystal alloy is used in the rotor disk 166. Thus, there is a synergy to using the single crystal alloy with respect to the tuned clearance response. That is, due to the higher mechanical properties of the single crystal alloy, the rotor disk 166 can be designed with less mass to permit the rotor disk 166 to be less centrifugally and more thermally growth responsive to a given operational scenario. While the single crystal alloy can be used to address temperature considerations, the synergistic benefit of using such a material comes from the tuned clearance response, which would not be expected from mere use of such a material only where temperature dictates.

In further examples, the tuned clearance response can be represented by a triangular design envelope, represented within the dashed lines 196 in FIG. 5. The upper dashed line extends from the spectrum or locus of steady-state operation condition to the idle point and the lower dashed line extends to the lower extreme position of takeoff and acceleration of the engine. The area of this performance triangle envelope is a representation of the effect of the size mass mismatch between the rotor disk 166 and the case 64 and can be changed by tuning the rotor disk 166, with regard to the centrifugal and thermal growth responsiveness, effectively making the triangle smaller in vertical sections through it which indicate that steady state clearances are smaller at all part-power steady state conditions and all transients from these steady state points are smaller as the pass to the bottom of the triangle, all of which his highly desirable from a compressor stability standpoint. For example, the height of the performance triangle envelope can be reduced and thus the case 64 can be positioned relatively closer to the tips of the blades 168 to provide a tighter clearance. Thus, in some examples, the rotor disk 66 is tuned in accordance with the size of this performance triangle envelope.

In further examples of the single crystal alloy, the alloy is a nickel-based superalloy, such as a nickel and iron-based alloy of Inconel 718 and similar. This alloy provides strengthening through precipitation at relatively low temperatures. An example of such an alloy has a composition, by weight, of 0.02-0.6% carbon, 15-22% chromium, 0-9% molybdenum, 0-3% tungsten, 0-9% cobalt, 2.5-40% iron, 2.9-6.5% niobium, 0.2-1.8% titanium, 0.2-1.45% aluminum, 0-0.005% boron, in a remainder of nickel and impurities.

Another example single crystal alloy includes a relatively high amount of grain boundary strengthening elements, such as carbon, boron, zirconium, and hafnium. This alloy generally has high tensile strength at lower temperatures and greater fracture resistance and the ability to tolerate grain defects. An example composition of such an alloy is a gamma prime precipitation strengthened nickel-based alloy that includes, by weight, 0.03-0.35% carbon, 9-30% chromium, 3-10% molybdenum, 0-8% tungsten, 0-20% cobalt, 0-3.6% niobium, 1-5% titanium, 1-5% aluminum, 0.001-0.04% boron, 0-10% tantalum, 0-0.2% zirconium, 0-1% hafnium, 0-0.8% vanadium, and a remainder of nickel and impurities.

Another example single crystal alloy is a creep-resistant alloy that has high temperature performance. An example composition of such an alloy includes, by weight, 0-0.08% carbon, 2-13% chromium, 0-6% molybdenum, 4-12.5% tungsten, 0-20% cobalt, 0-0.6% niobium, 0-5% titanium, 3-6.5% aluminum, 0-0.018% boron, 3-12% tantalum, 0-0.05% zirconium, 0-1.2% hafnium, 0-6% rhenium, 0-6% ruthenium, and a remainder of nickel and impurities.

Figure 6:
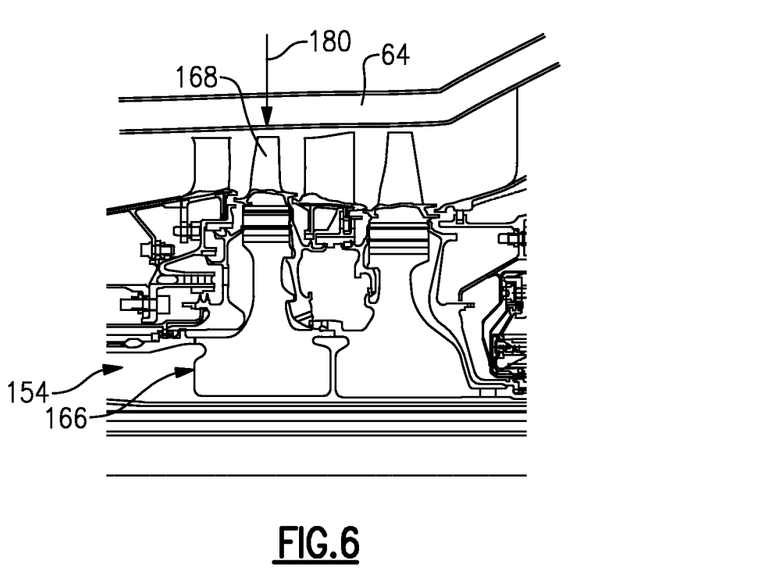
FIG. 6 illustrates an example of a turbine section.
Figure 7:
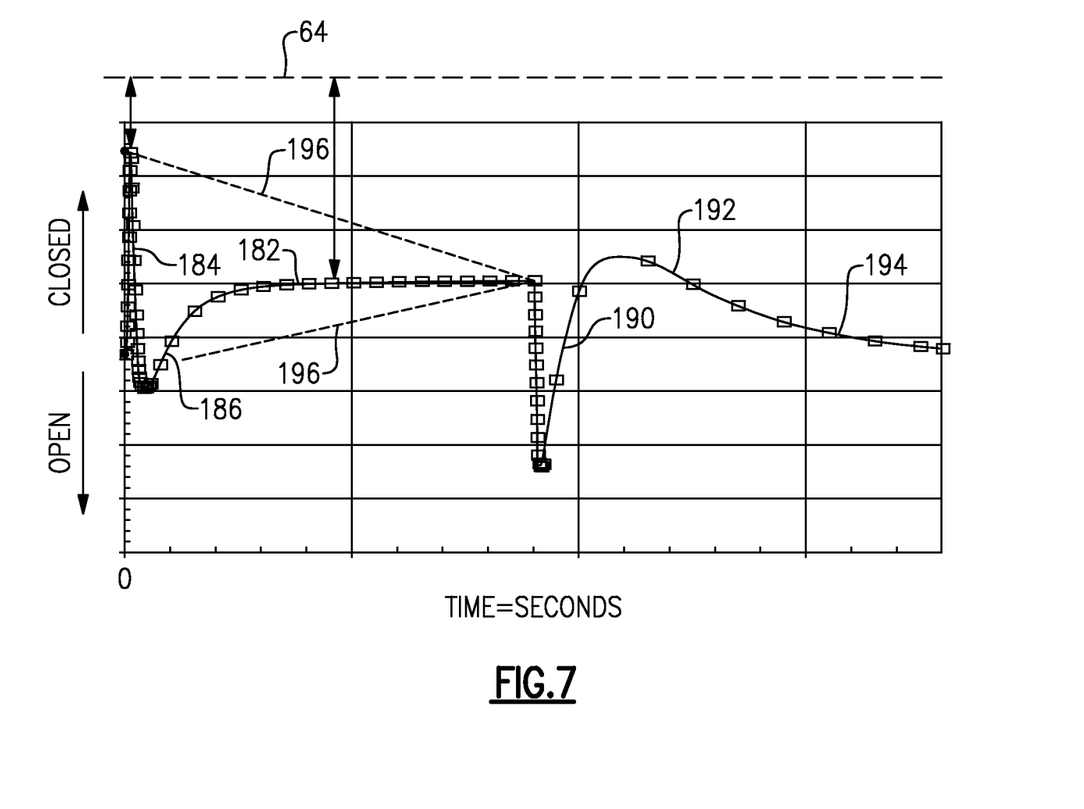
FIG. 7 schematically illustrates a clearance between tips of rotor blades of a rotor and a corresponding case through various engine operational scenarios.

FIG. 6 illustrates another example in which the rotor disk 166 is in a second (or high) pressure turbine 154. FIG. 7 illustrates the representative line 182, similar to that in FIG. 5, but inverted according to the depiction of the second (or high) pressure turbine 154 (i.e., the case 64 is toward the top of FIG. 6). Likewise, as discussed above, the rotor disk 166 can be tuned to change the peaks/valleys of the line 182 and the shape of the line 182 for the turbine 154 for a given operational scenario, and thus reduce clearance in the turbine.

Figure 8:
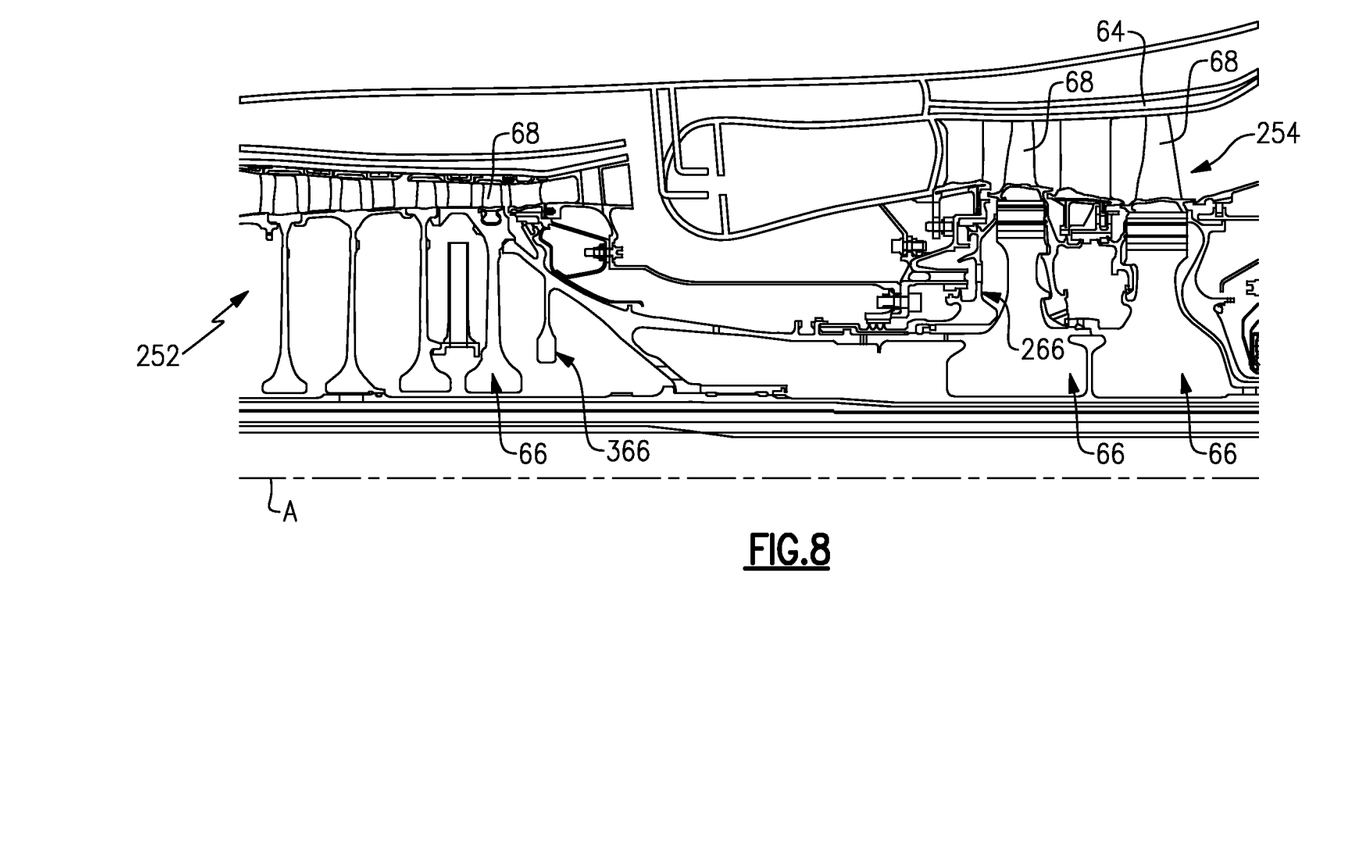
FIG. 8 illustrates an example of rotor mini-disks.

FIG. 8 illustrates another example of a second (or high) pressure turbine 254. In this example, there are several primary rotor disks 66 with corresponding blades 68, as described herein. An additional rotor disk 266 is situated forward of one of the primary rotor disks 66. In this case, the additional rotor disk 266 is a mini-disk that does not itself include any blades 68 but serves to mechanically support the immediately adjacent rotor disk 66. Similarly, a second (or high) pressure compressor 252 can include one or more primary rotor disks 66 that include blades 68, with an additional rotor disk 366, a mini-disk, immediately adjacent the primary rotor disk 66. The rotor disk 366 mechanically supports the primary rotor disk 66 but itself does not have any blades 68. The mini-disk 266 and/or 366 can also be formed of the single crystal alloy, as described above, such that they are tuned as described herein. That is, although the mini-disks 266 and 366 do not directly support any of the blades 68, through mechanical interconnection with the primary rotor disks 66, the mini-disks 266 and 366 also serve to influence the clearance with the case 64, and may be tuned accordingly.

Turning once again to "T3" and OPR, the tuning discussed herein and the ability to further tighten clearance can enable increases in "T3" and OPR. For example, at higher "T3" and higher OPR, if clearances are not reduced, the inefficiencies from gas escape through such clearances would be exacerbated. By tightening clearances through the tuning and the tuned clearance response herein, such inefficiencies can be reduced, thus enabling realization of the benefits of increased "T3" and OPR.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A gas turbine engine comprising:
a compressor having a rotor including a rotor disk and a plurality of circumferentially-spaced blades, the rotor disk and the blades being co-rotatable about an axis; and
a case circumscribing the rotor,
the rotor disk being formed of a superalloy that has a single crystal structure in order to tune the rotor disk, with regard to centrifugal and thermal growth responsiveness, to the case for a given operational scenario of the gas turbine engine such that the rotor disk and case together provide a tuned clearance response, the operational scenario involving a series of engine events including at least two of: engine acceleration, engine deceleration, and engine steady-state operation, wherein the rotor disk includes a central hub, a rim, and the central hub tapers to a neck that connects to the rim, the central hub is axially-enlarged fore and aft of the rim, and the rotor is in at least one of a final five stages of the compressor.

2. A gas turbine engine comprising:
a compressor having a rotor including a rotor disk that is rotatable about an axis; and
a case circumscribing the rotor, wherein,
the rotor disk having at least a centrifugal and thermal growth responsiveness to a given operational scenario of the gas turbine engine such that instantaneous location of tips of the blades vary during the operational scenario,
the case having at least a thermal responsiveness to the operational scenario such that instantaneous location of the case varies during the operational scenario,
the operational scenario involving a series of engine events including at least two of: engine acceleration, engine deceleration, and engine steady-state operation, and
the rotor disk being formed of a superalloy that has a single crystal structure in order to tune the rotor disk, with regard to the centrifugal and thermal growth responsiveness of the rotor disk, to the case for the operational scenario such that the rotor disk and case together provide a tuned clearance response, wherein the rotor disk includes a central hub, a rim, and the central hub tapers to a neck that connects to the rim, the central hub is axially-enlarged fore and aft of the rim, and the rotor is in at least one of a final five stages of the compressor.

3. A method for a gas turbine engine, the method comprising:
a compressor having a rotor that includes a rotor disk and a plurality of circumferentially-spaced blades, the rotor disk and the blades are co-rotatable about an axis; and
a case that circumscribes the rotor, wherein,
the rotor disk has at least a centrifugal and thermal growth responsiveness to a given operational scenario of the gas turbine engine such that instantaneous location of tips of the blades vary during the operational scenario,
the case has at least a thermal responsiveness to the operational scenario such that instantaneous location of the case varies during the operational scenario,
the operational scenario involves a series of engine events that include at least two of: engine acceleration, engine deceleration, and engine steady-state operation, and
tuning the rotor disk, with regard to the centrifugal and thermal growth responsiveness of the rotor disk, to the case for the operational scenario such that the rotor disk and case together provide a tuned clearance response, the tuning including selecting the rotor disk to be formed of a superalloy that has a single crystal structure, wherein the rotor disk includes a central hub, a rim, and the central hub tapers to a neck that connects to the rim, the central hub is axially-enlarged fore and aft of the rim, and the rotor is in at least one of a final five stages of the compressor.

4. The gas turbine engine as recited in claim 1, wherein the superalloy has a composition, by weight, of 0.02-0.6% carbon, 15-22% chromium, 0-9% molybdenum, 0-3% tungsten, 0-9% cobalt, 2.5-40% iron, 2.9-6.5% niobium, 0.2-1.8% titanium, 0.2-1.45% aluminum, 0-0.005% boron, and a remainder of nickel.

5. The gas turbine engine as recited in claim 1 wherein the superalloy is a gamma prime precipitation strengthened nickel-based alloy that has a composition, by weight, of 0.03-0.35% carbon, 9-30% chromium, 3-10% molybdenum, 0-8% tungsten, 0-20% cobalt, 0-3.6% niobium, 1-5% titanium, 1-5% aluminum, 0.001-0.04% boron, 0-10% tantalum, 0-0.2% zirconium, 0-1% hafnium, 0-0.8% vanadium, and a remainder of nickel.

6. The gas turbine engine as recited in claim 2, wherein the superalloy has a composition, by weight, of 0.02-0.6% carbon, 15-22% chromium, 0-9% molybdenum, 0-3% tungsten, 0-9% cobalt, 2.5-40% iron, 2.9-6.5% niobium, 0.2-1.8% titanium, 0.2-1.45% aluminum, 0-0.005% boron, and a remainder of nickel.

7. The gas turbine engine as recited in claim 2, wherein the superalloy is a gamma prime precipitation strengthened nickel-based alloy that has a composition, by weight, of 0.03-0.35% carbon, 9-30% chromium, 3-10% molybdenum, 0-8% tungsten, 0-20% cobalt, 0-3.6% niobium, 1-5% titanium, 1-5% aluminum, 0.001-0.04% boron, 0-10% tantalum, 0-0.2% zirconium, 0-1% hafnium, 0-0.8% vanadium, and a remainder of nickel.

8. The method as recited in claim 3, wherein the superalloy has a composition, by weight, of 0.02-0.6% carbon, 15-22% chromium, 0-9% molybdenum, 0-3% tungsten, 0-9% cobalt, 2.5-40% iron, 2.9-6.5% niobium, 0.2-1.8% titanium, 0.2-1.45% aluminum, 0-0.005% boron, and a remainder of nickel.

9. The method as recited in claim 3, wherein the superalloy is a gamma prime precipitation strengthened nickel-based alloy that has a composition, by weight, of 0.03-0.35% carbon, 9-30% chromium, 3-10% molybdenum, 0-8% tungsten, 0-20% cobalt, 0-3.6% niobium, 1-5% titanium, 1-5% aluminum, 0.001-0.04% boron, 0-10% tantalum, 0-0.2% zirconium, 0-1% hafnium, 0-0.8% vanadium, and a remainder of nickel.

10. The gas turbine engine as recited in claim 1, wherein the superalloy is a nickel-based superalloy that has a solvus temperature greater than 2400° F. (1316° C.).

11. The gas turbine engine as recited in claim 2, wherein the superalloy is a nickel-based superalloy that has a solvus temperature greater than 2400° F. (1316° C.).

12. The method as recited in claim 3, wherein the superalloy is a nickel-based superalloy that has a solvus temperature greater than 2400° F. (1316° C.).

* * * * *